United States Patent
Cho et al.

(10) Patent No.: US 12,263,589 B2
(45) Date of Patent: Apr. 1, 2025

(54) ROBOT COMPRISING HYDRAULIC PRESSURE POWER UNIT

(71) Applicant: Rainbow Robotics, Daejeon (KR)

(72) Inventors: Bu Youn Cho, Daejeon (KR); Jun Ho Oh, Seoul (KR)

(73) Assignee: Rainbow Robotics, Daejeon (KR)

( * ) Notice: Subject to any disclaimer, the term of this patent is extended or adjusted under 35 U.S.C. 154(b) by 115 days.

(21) Appl. No.: 18/059,384

(22) Filed: Nov. 28, 2022

(65) Prior Publication Data

US 2024/0157547 A1    May 16, 2024

(30) Foreign Application Priority Data

Nov. 14, 2022    (KR) .......... 10-2022-0151737

(51) Int. Cl.
*B25J 9/14* (2006.01)
(52) U.S. Cl.
CPC ..................... *B25J 9/14* (2013.01)
(58) Field of Classification Search
CPC ..... B25J 9/14; B25J 9/146; B25J 9/148; B25J 9/0006
See application file for complete search history.

(56) References Cited

U.S. PATENT DOCUMENTS

| | | | | |
|---|---|---|---|---|
| 4,581,893 A | * | 4/1986 | Lindbom | B25J 9/14 60/368 |
| 2004/0261408 A1 | | 12/2004 | Fleming et al. | |
| 2005/0207921 A1 | | 9/2005 | Gray, Jr. | |
| 2015/0226234 A1 | | 8/2015 | Amundson et al. | |
| 2023/0058389 A1 | * | 2/2023 | Kaveny | A61B 5/4528 |

FOREIGN PATENT DOCUMENTS

| | | |
|---|---|---|
| KR | 10-1994-0010410 B1 | 10/1994 |
| KR | 10-1943762 B1 | 1/2019 |

OTHER PUBLICATIONS

Shimizu, Juri et al. âDownsizing the Motors of a Biped Robot Using a Hydraulic Direct Drive System.â 2018 IEEE-RAS 18th International Conference on Humanoid Robots (Humanoids) (2018): 580-586. (Year: 2018).*
Wikipedia contributors. "Tandem-rotor aircraft." Wikipedia, The Free Encyclopedia. Wikipedia, The Free Encyclopedia, Aug. 20, 2022. Web. May 17, 2024. (Year: 2022).*
International Search Report & Written Opinion for PCT/KR2023/013801 by Korean Intellectual Property Office dated Dec. 21, 2023.

* cited by examiner

*Primary Examiner* — Joseph Brown
(74) *Attorney, Agent, or Firm* — BROADVIEW IP LAW, PC

(57) ABSTRACT

The present invention relates to a robot including a hydraulic power unit comprising: a body having a hydraulic channel through which a fluid is movable, a hydraulic power unit having a plurality of pumps and discharging a fluid to the hydraulic channel by using rotational force of the plurality of pumps, and a control unit for controlling the rotation of the plurality of pumps, wherein the plurality of pumps comprises: a first pump rotating in a first rotational direction and discharging a fluid to the hydraulic channel by a rotational force in the first rotational direction, and a second pump rotating in a second rotational direction and discharging a fluid to the hydraulic channel by a rotational force in the second rotational direction, wherein the first rotational direction is different from the second rotational direction.

10 Claims, 12 Drawing Sheets

Net force in the first direction

External force (Disturbance) from the first direction

ROBOT COMPRISING HYDRAULIC PRESSURE POWER UNIT

CROSS REFERENCE TO RELATED APPLICATIONS

This application claims priority under 35 U.S.C § 119 to Korean Patent Application No. 10-2022-0151737 filed in the Korean Intellectual Property Office on Nov. 14, 2022, the entire contents of which are hereby incorporated by reference.

BACKGROUND OF THE INVENTION

Field of the Invention

The present invention relates to a robot including a hydraulic power unit. More specifically, the present invention relates to a robot including a hydraulic power unit driven by using pressure of a fluid discharged from a pump.

Background Art

A robot refers to a multifunctional manipulator designed to perform specific motions and tasks through programmed variable motions. Robots have been widely used in a variety of industries, including manufacturing, transportation, exploration, medical treatment, surveillance, patrol, and the like.

A hydraulically driven robot is a robot that is supplied with a driving force by a fluid supplied through a supply terminal. The hydraulically driven robot obtains hydraulic energy by rotating a pump included in a hydraulic power unit and discharging the fluid by rotational force of the pump.

In a case in which the hydraulically driven robot operates the hydraulic power unit, as the velocity of the pump changes, a reaction force may be generated on a body of the robot due to rotational inertia of the pump.

The reaction force may degrade robot control performance by acting as a disturbance on the body of the robot.

SUMMARY OF THE INVENTION

Accordingly, the present invention has been made to solve the above-mentioned problems occurring in the prior arts, and it is an object of the present invention to provide a robot including a hydraulic power unit capable of minimizing a reaction force according to driving of the hydraulic power unit.

It is another object of the present invention to provide a robot including a hydraulic power unit capable of advantageously controlling the reaction force of the pump, thereby facilitating a posture control of the robot and better resisting a disturbance applied to the robot.

According to an embodiment of the present invention, a robot including a hydraulic power unit comprising: a body having a hydraulic channel through which a fluid is movable; a hydraulic power unit having a plurality of pumps, and discharging the fluid to the hydraulic channel by using rotational force of the plurality of pumps; and a control unit for controlling the rotation of the plurality of pumps, wherein the plurality of pumps comprises: a first pump rotating in a first rotational direction and discharging the fluid to the hydraulic channel by a rotational force in the first rotational direction; and a second pump rotating in a second rotational direction and discharging the fluid to the hydraulic channel by a rotational force in the second rotational direction, wherein the first rotational direction is different from the second rotational direction.

According to the embodiments of the present invention, the robot including a hydraulic power unit can minimize a reaction force according to driving of the hydraulic power unit.

Additionally, the robot including a hydraulic power unit according to the embodiments of the present invention can advantageously control the reaction force of the pump, thereby facilitating a posture control of the robot and better resisting a disturbance applied to the robot.

DETAILED DESCRIPTION OF THE PREFERRED EMBODIMENT

Figure 1:
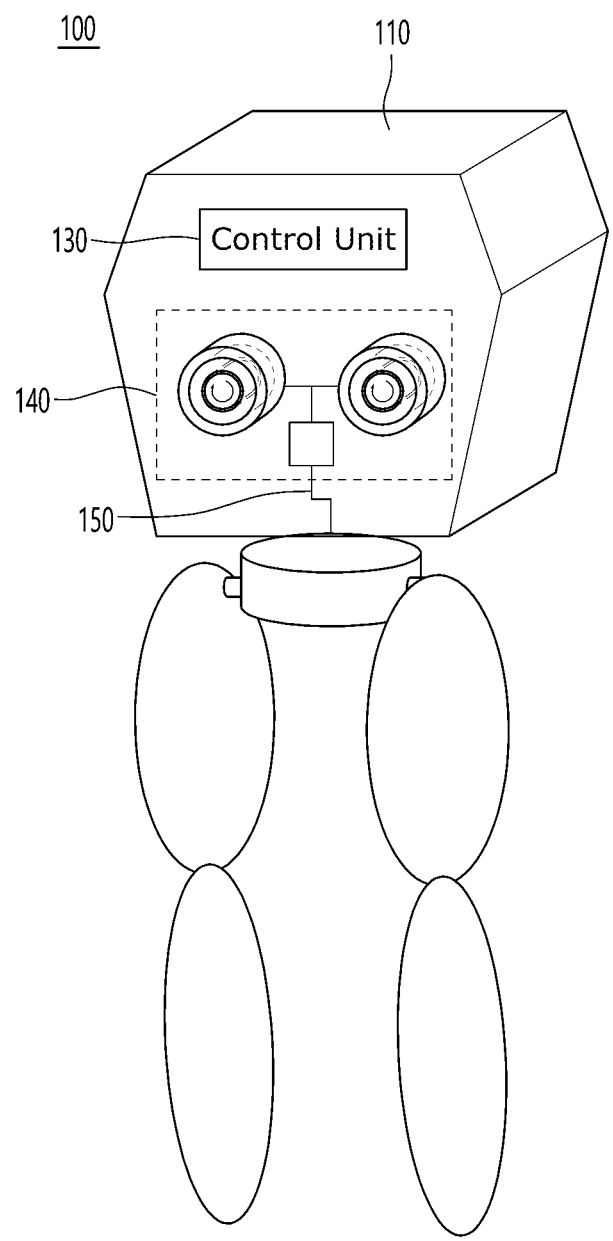
FIG. 1 is a schematic diagram illustrating a robot including a hydraulic power unit according to an embodiment of the present invention.

Hereinafter, an explanation of embodiments of the present invention will be given in detail with reference to the attached drawings. Objects, characteristics and advantages of the present invention will be more clearly understood from the detailed description as will be described below and the attached drawings. Before the present invention is disclosed and described, it is to be understood that the disclosed embodiments are merely exemplary of the invention, which can be embodied in various forms. Those skilled in the art will envision many other possible variations within the scope of the present invention.

In the description, the corresponding parts in the embodiments of the present invention are indicated by corresponding reference numerals and the repeated explanation on the corresponding parts will be avoided. If it is determined that the detailed explanation on the well known technology related to the present invention makes the scope of the present invention not clear, the explanation will be avoided for the brevity of the description.

All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification. Terms used in this application are used to only describe specific exemplary embodiments and are not intended to restrict the present invention. An expression referencing a singular value additionally refers to a corresponding expression of the plural number, unless explicitly limited otherwise by the context.

Terms, such as the first, the second, A, B, (a), and (b) may be used to describe various elements, but the elements should not be restricted by the terms. The terms are used to only distinguish one element from the other element. When it is said that one element is described as being "connected" or "coupled" to the other element, one element may be directly connected or coupled to the other element, but it should be understood that another element may be present between the two elements.

Hereinafter, an explanation of embodiments of the present invention will be given in detail with reference to the attached drawings.

FIG. 1 is a schematic diagram illustrating a robot including a hydraulic power unit according to an embodiment of the present invention. FIG. 1 illustrates a humanoid robot having two legs as a robot capable of walking, but the scope of the present invention is not limited thereto. For example, the robot 100 may be a horse-shaped robot having four legs, a robot equipped with wheels instead of legs as means of movement, or a non-moving robot fixed to a specific position.

Referring to FIG. 1, the robot 100 includes a body 110, a control unit 130, a hydraulic power unit 140, and a hydraulic channel 150. One or more legs are coupled to the body 110, and each leg may have an upper portion and a lower portion separated by a leg joint.

The body 110 includes the control unit 130, the hydraulic power unit 140, and/or the hydraulic channel 150 through which a fluid can move, and provides a housing therefor.

The control unit 130 controls the operations of the components constituting the robot 100. The control unit 130 controls the operation of the hydraulic power unit 140, and the rotation of one or more pumps included in the hydraulic power unit 140, and adjusts the rotational velocity or rotational angular velocity of the one or more pumps to a predetermined level.

The hydraulic power unit 140 is a component providing a driving force for operating the robot 100, for example, hydraulic energy. The hydraulic power unit 140 includes a plurality of pumps, and generates pressure in the fluid in the hydraulic channel 150 by discharging the fluid to the hydraulic channel 150 by rotational motion of the plurality of pumps. The generated pressure is transmitted to the legs, arms, or other manipulators of the robot 100, and acts as a driving force operating the legs, arms, or other manipulators.

In this instance, the plurality of pumps may include a first pump and a second pump rotating in different directions. The first pump and the second pump generate reaction forces in a specific direction by rotational inertia of the first pump and the second pump, but a first reaction force generated by the first pump and a second reaction force generated by the second pump offset to each other so that the resultant force may be smaller than the first reaction force or the second reaction force. It will be described in more detail below in FIG. 2.

Meanwhile, as an embodiment, the robot 100 may further include at least one appendage, such as an articulated arm, disposed on the body 110 to be movable relative to the body 110. One or more actuators for gripping/grasping objects may be disposed at a distal end of the articulated arm.

The robot 100 may include a vision system having an imaging sensor or camera, and each sensor or camera collects image data or sensor data about the environment and terrain around the robot 100. The vision system may pan or tilt the camera to move the visual field of the robot 100 in any direction. The image data or sensor data collected by the cameras or sensors of the vision system may be provided to the control unit 130.

Figure 2:
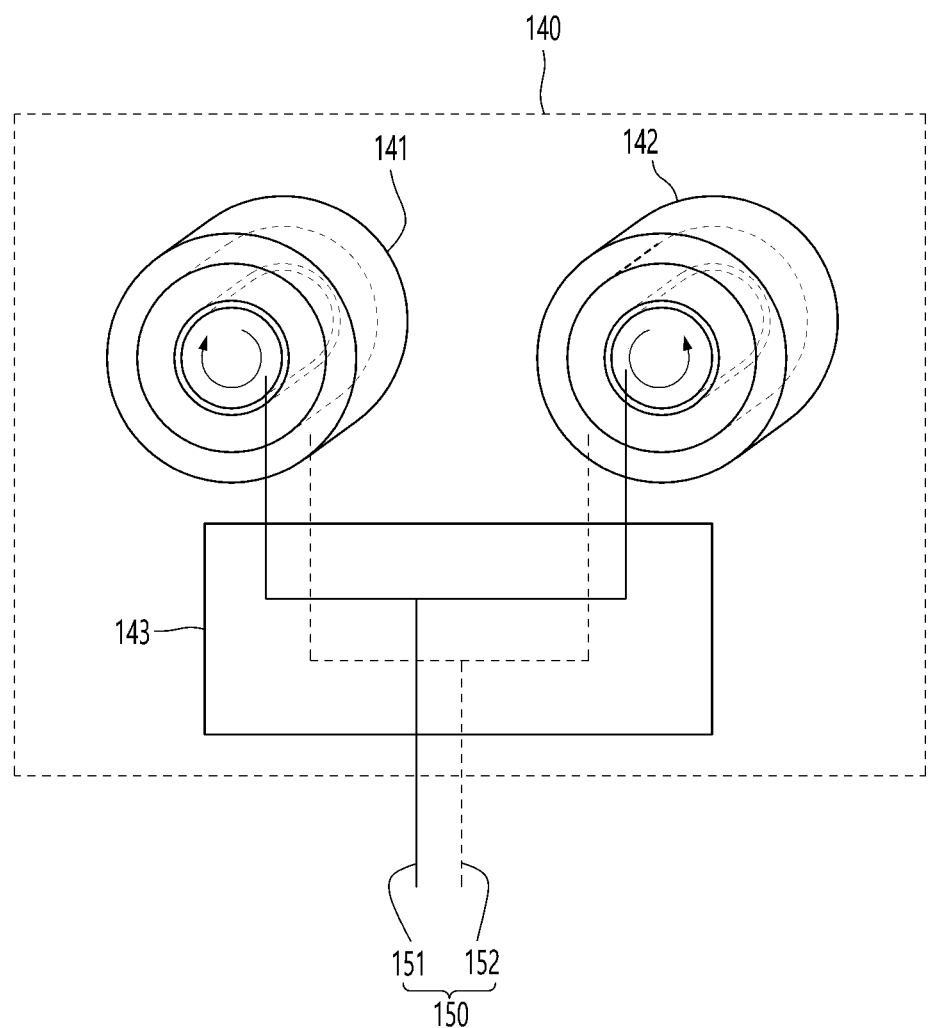
FIG. 2 is a diagram illustrating a detailed configuration of the hydraulic power unit of FIG. 1.

FIG. 2 is a diagram illustrating a detailed configuration of the hydraulic power unit of FIG. 1. Referring to FIG. 2, the hydraulic power unit 140 includes a first pump 141, a second pump 142, and/or a manifold 143.

The first pump 141 rotates in a first rotational direction and discharges the fluid to the hydraulic channel 150 by rotational force in the first rotational direction.

The second pump 142 rotates in a second rotational direction and discharges the fluid to the hydraulic channel 150 by rotational force in the second rotational direction.

As an embodiment, the first rotational direction may be opposite to the second rotational direction. For example, the first rotational direction may be clockwise, and the second rotational direction may be counterclockwise.

The hydraulic channel 150 may include a high pressure channel 151 and a low pressure channel 152 respectively connected to the first pump 141 and the second pump 142. The high pressure channel 151 is a channel through which fluid is discharged from the pumps 141 and 142, and is a channel for transmitting the driving force to each component of the robot 100. The low-pressure channel 152 is a channel that transmits the driving force to each component of the robot 100, and returns the pressure-reduced fluid to the pumps 141 and 142.

The manifold 143 guides the position of the hydraulic channel 150 inside the hydraulic power unit 140, and includes a physical partition to protect the hydraulic channel 150 from external impact.

On the other hand, as illustrated in FIG. 2, in a case in which pump pairs 141 and 142 having opposed rotational directions to each other are provided in the hydraulic power unit 140, the reaction forces due to the rotational inertia of the pump 141 and 142 may offset to each other. Furthermore, in a case in which the pumps 141 and 142 are controlled to have different rotational velocities with respect to the pump pairs 141 and 142 having opposed rotational directions to each other, a net force of the reaction force in a specific direction may occur, and the net force of the reaction force may be used for posture control of the robot 100. It will be described in more detail with reference to FIG. 3 below.

Figure 3:
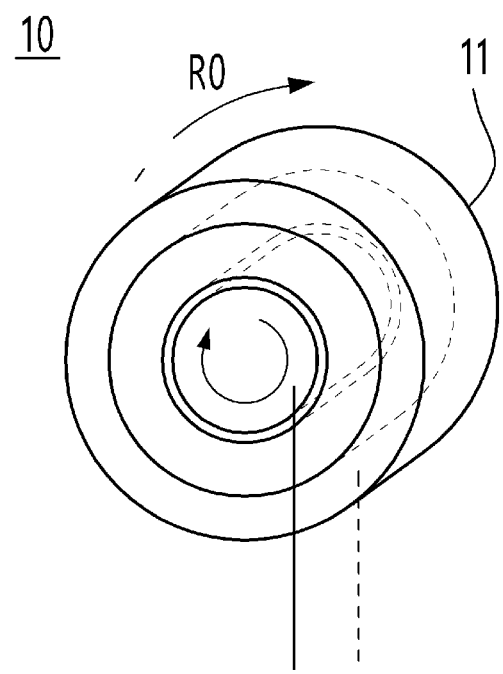
FIG. 3 is a diagram illustrating a hydraulic power unit of a conventional robot.

FIG. 3 is a diagram for depicting a hydraulic power unit of a conventional robot. As illustrated in FIG. 3, the hydraulic power unit 10 of the conventional robot discharges a fluid to a hydraulic channel through a pump 11.

In general, in a case in which a flow rate to be supplied from the pump 11 to drive the robot is varied depending on time, the rotational velocity of the pump 11 is flexibly changed to prevent excessive energy supply. In order to change the rotational velocity of the pump 11, a corresponding torque is required, and a reaction force R0 corresponding to the torque is generated by the torque generated to change the rotational velocity of the pump 11, and the reaction force R0 is transmitted to the body of the robot equipped with a hydraulic power unit 10. The reaction force R0 transmitted to the body of the robot acts as a disturbance in terms of controlling the motion and posture of the robot, and adversely affects the motion and posture control of the robot.

Figure 4:
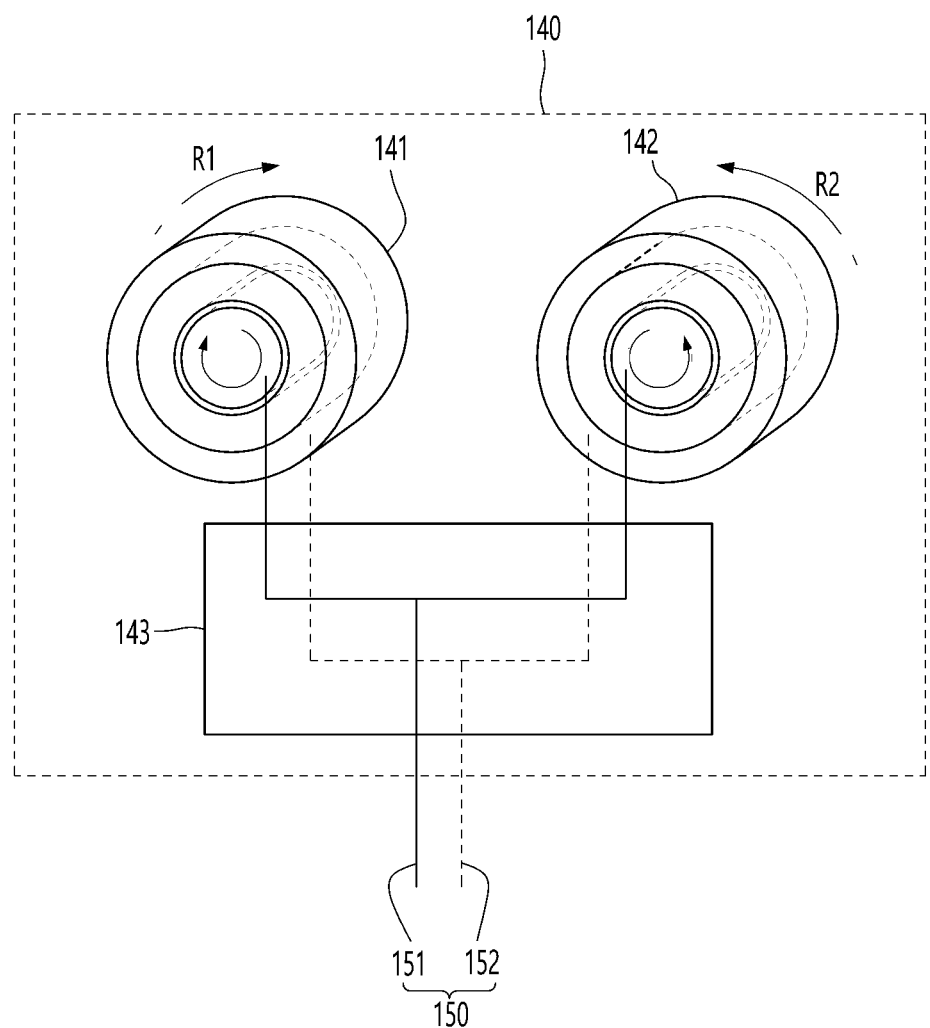
FIG. 4 is a view for depicting a principle that reaction forces by a plurality of pumps offset to each other in the hydraulic power unit according to an embodiment of the present invention.

FIG. 4 is a view for depicting a principle that reaction forces by a plurality of pumps offset to each other in the hydraulic power unit according to an embodiment of the present invention. As illustrated in FIG. 2, also in FIG. 4, the hydraulic power unit 140 includes a first pump 141, a second pump 142, and/or a manifold 143. Each of the pumps 141 and 142 is connected to the hydraulic channel 150. Since the specific contents of the first pump 141, the second pump 142, the manifold 143, and the hydraulic channel 150 have been previously described in FIG. 2, in order to avoid repetition in description, relevant descriptions will be omitted.

The first pump 141 and the second pump 142 rotate in different directions to each other, and generate reaction forces in the different directions to each other by torque generated during the rotation process thereof. For example, the first pump 141 may generate a first reaction force R1 in a first rotational direction, and the second pump 142 generates a second reaction force R2 in a second rotational direction.

In this instance, a resultant force of the first reaction force R1 and the second reaction force R2 acts to the robot 100 as a net force of the reaction force. Since the directions of the first reaction force R1 and the second reaction force R2 are different from each other, the first reaction force R1 and the second reaction force R2 may offset to each other at least partially.

Preferably, the first pump 141 and the second pump 142 are disposed so that the direction of a first rotational axis of the first pump 141 and the direction of a second rotational axis of the second pump 142 are the same. In a case in which the first rotational direction of the first pump 141 and the second rotational direction of the second pump 142 are arranged to be opposed to each other, the first reaction force R1 and the second reaction force R2 may offset to each other the most efficiently.

Figure 5:
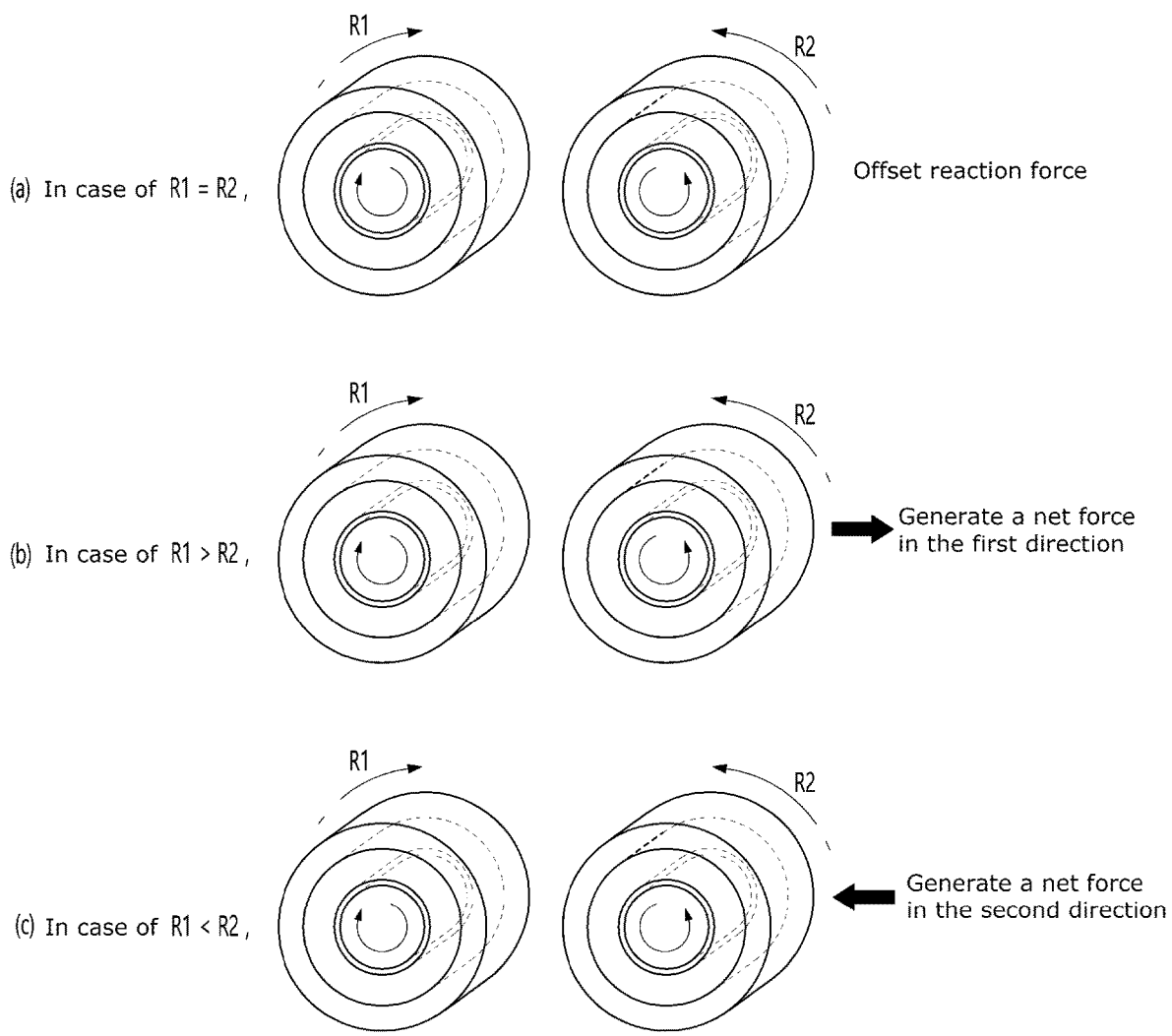
FIG. 5 is a view for depicting a principle that net forces of the reaction forces are generated differently according to relative sizes of the reaction forces between the plurality of pumps.

In this instance, in a case in which the rotation of the first pump 141 and the rotation of the second pump 142 are controlled to adjust the magnitude of the relative force between the first reaction force R1 and the second reaction force R2, the net force of the reaction force may be generated in various forms. Referring to FIG. 5, further description will be provided.

FIG. 5 is a view for depicting a principle that net forces of the reaction forces are generated differently according to relative sizes of the reaction forces between the plurality of pumps

5A illustrates a net force of the reaction force in a case in which the magnitudes of the first reaction force R1 and the second reaction force R2 are equal to each other. In this case, since the first reaction force R1 and the second reaction force R2 are in the opposite directions to each other and have the same magnitude, the first reaction force R1 and the second reaction force R2 completely offset to each other, so that the net force of the reaction force becomes theoretically zero.

5B illustrates a net force of the reaction force in a case in which the magnitude of the first reaction force R1 is relatively greater than the magnitude of the second reaction force R2. In this case, a portion of the first reaction force R1 is offset by the second reaction force R2. However, since the magnitude of the first reaction force R1 is greater than the magnitude of the second reaction force R2, the residual force of the first reaction force R1 remaining after the offset acts as the net force of the reaction force in the first direction (here, in the right direction).

5C illustrates a net force of the reaction force in a case in which the magnitude of the first reaction force R1 is relatively smaller than the magnitude of the second reaction force R2. In this case, the first reaction force R1 is completely offset by the second reaction force R2. However, since the magnitude of the first reaction force R1 is smaller than the magnitude of the second reaction force R2, contrary to FIG. 5B, the residual force of the second reaction force R2 remaining after the offset acts as the net force of the reaction force in the second direction (here, in the left direction).

Figure 6:
FIGS. 6 and 7 are views for depicting examples in which the net forces of the reaction forces are utilized for control of the robot.
Figure 6:
Figure 7:
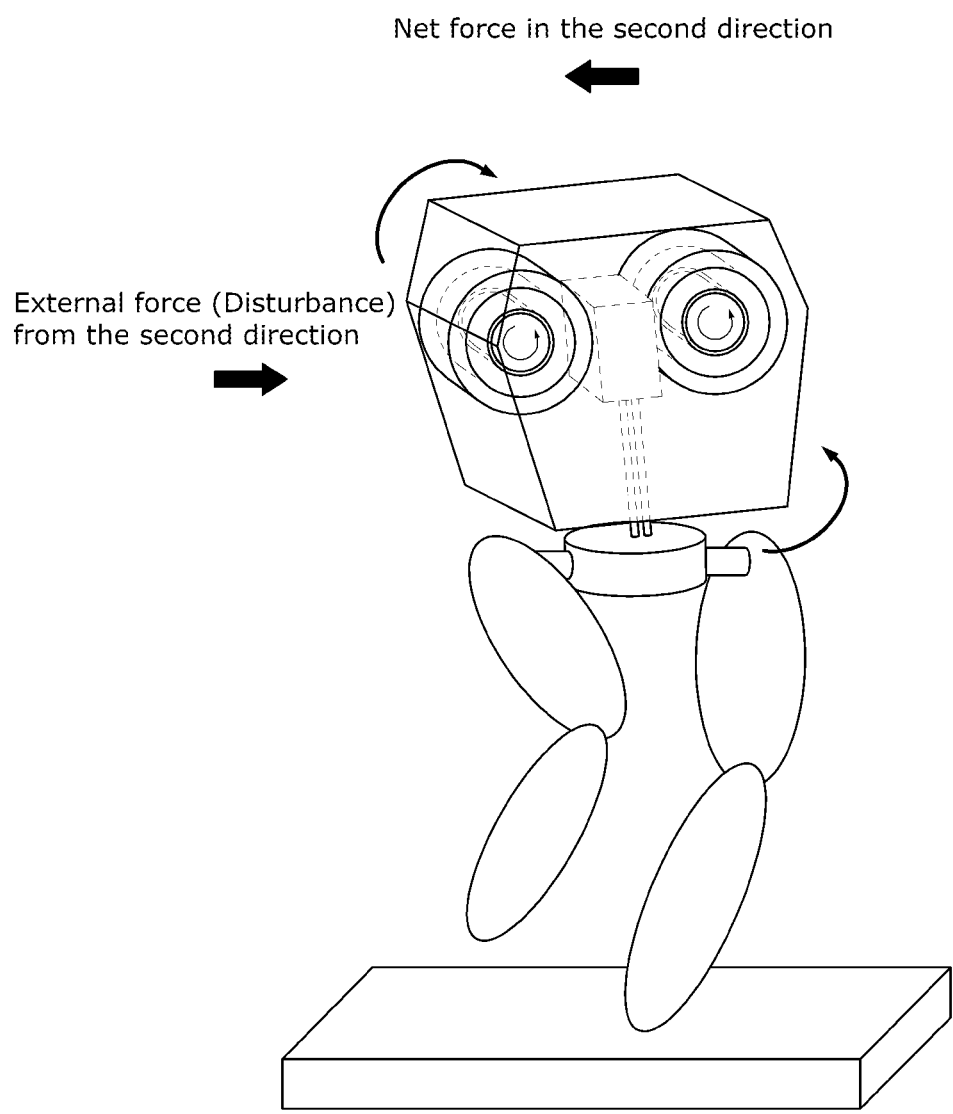

FIGS. 6 and 7 are views for depicting examples in which the net forces of the reaction forces are utilized for control of the robot FIG. 6 illustrates a case in which an external force from the first direction (here, the right direction) acts to the robot, for example, a case in which strong wind blows from the first direction. In this case, if torque which is stronger than the torque of the second pump 142 is applied to the first pump 141 by the control unit 130 (see FIG. 5B), the magnitude of the first reaction force R1 becomes relatively greater than the magnitude of the second reaction force R2, so that the residual force of the first reaction force R1 remaining after offset acts as the net force of the reaction force in the first direction (here, the right direction). In this case, in the environment of FIG. 6, the net force of the reaction force acts as a resistance to the external force (disturbance) coming from the first direction, thereby helping the posture control of the robot and getting stronger against disturbance.

FIG. 7 illustrates a case in which an external force from the second direction (here, the left direction) acts to the robot, for example, a case in which strong wind blows from the second direction. In this case, if torque which is weaker than the torque of the second pump 142 is applied to the first pump 141 by the control unit 130 (see FIG. 5C), the magnitude of the first reaction force R1 becomes relatively smaller than the magnitude of the second reaction force R2, so that the residual force of the second reaction force R2 remaining after offset acts as the net force of the reaction force in the second direction (here, the left direction). In this case, in the environment of FIG. 7, the net force of the reaction force acts as a resistance to the external force (disturbance) coming from the second direction, thereby helping the posture control of the robot and getting stronger against disturbance.

Figure 8:
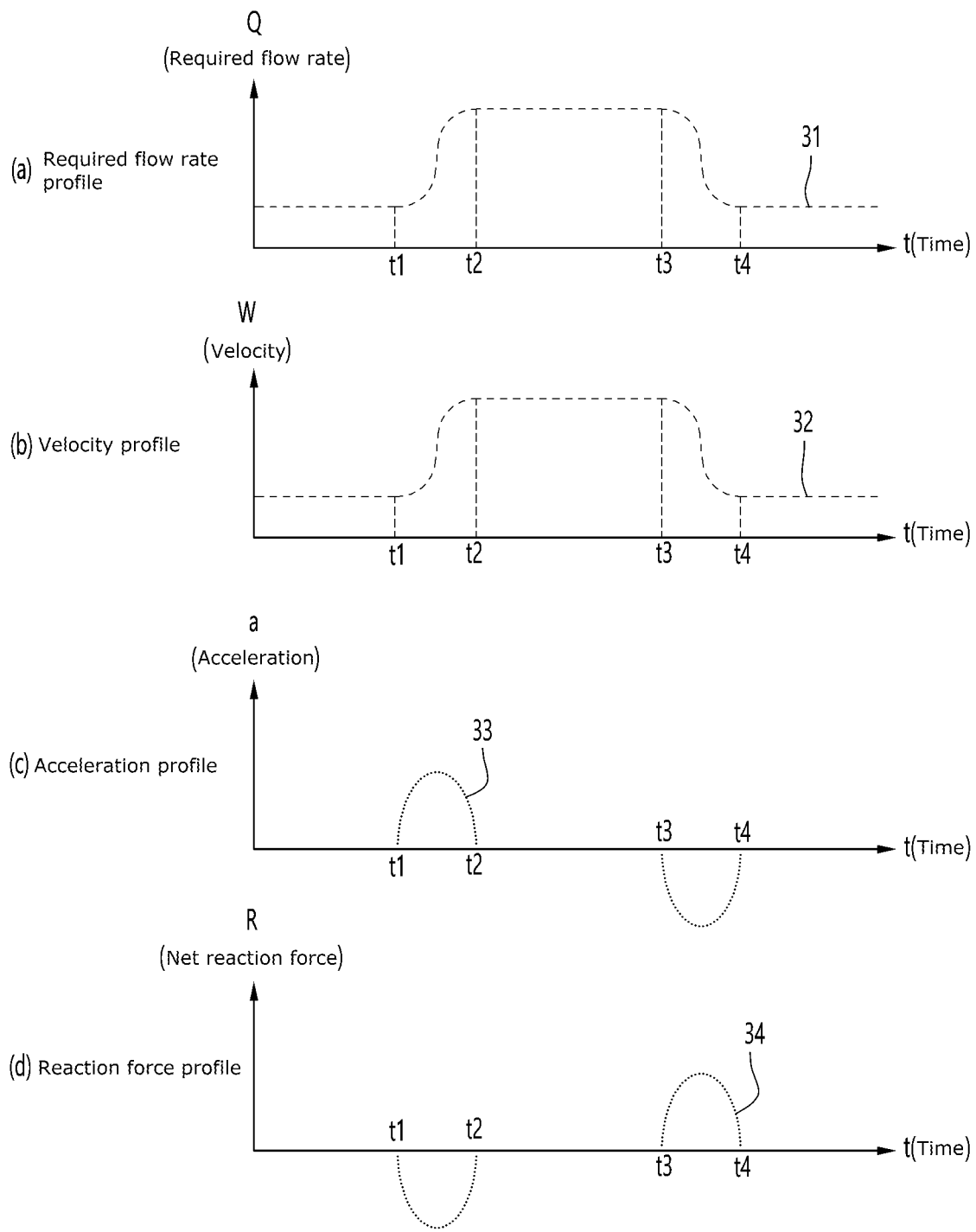
FIG. 8 is a diagram illustrating a velocity profile, acceleration profile, and a reaction force profile of a conventional robot.

FIG. 8 is a diagram illustrating a velocity profile, acceleration profile, and a reaction force profile of a conventional robot. FIG. 8A illustrates a required flow rate profile 31 of the conventional robot, FIG. 8B illustrates a velocity profile 32 of the conventional robot, FIG. 8C illustrates an acceleration profile 33 of the conventional robot, and FIG. 8D illustrates a reaction force profile 31 of the conventional robot.

The profiles 31, 32, 33 and 34 illustrated in FIG. 8 respectively show size changes of a required flow rate, a velocity, an acceleration, and a net force of a reaction force in a first time section ranging from t1 to t4.

The required flow rate profile 31 is a graph showing the flow rate of the fluid required for driving the robot as a size of the required flow rate relative to time. As illustrated in FIG. 8A, the required flow rate increases in a first section ranging from t1 to t2, is maintained relatively uniformly in a second section ranging from t2 to t3, and decreases in a third section ranging from t3 to t4.

The velocity profile 32 is a graph showing the velocity (here, rotational velocity) of the pump relative to time in order to meet the required flow rate profile. As illustrated in FIG. 8B, the velocity increases in the first section ranging from t1 to t2, is maintained relatively uniformly in the second section ranging from t2 to t3, and decreases in the third section ranging from t3 to t4.

The acceleration profile 33 is a graph showing the velocity (here, rotational acceleration velocity) of the pump relative to time in order to meet the velocity profile. As illustrated in FIG. 8C, the acceleration velocity has a positive value in the first section ranging from t1 to t2 since the velocity must increase, has a zero value in the second section ranging from t2 to t3 since the velocity must be maintained relatively uniformly, and has a negative value in the third section ranging from t3 to t4 since the velocity must decrease.

The reaction force profile 34 is a graph showing a net force of the reaction force generated depending on the acceleration profile relative to time. The sizes of the acceleration profile 33 and the reaction force profile 34 are proportional, but their signs have opposite values. Therefore, as illustrated in FIG. 8D, the reaction force has a negative value in the first section ranging from t1 to t2, has a zero value in the second section ranging from t2 to t3, and has a positive value in the third section ranging from t3 to t4.

As described above, the conventional robot having just one pump in the hydraulic power unit generates a net force of the reaction force according to the operation of the pump as illustrated in FIG. 8D, and the net force of the reaction force may act as a disturbance in operation of the robot.

Figure 9:
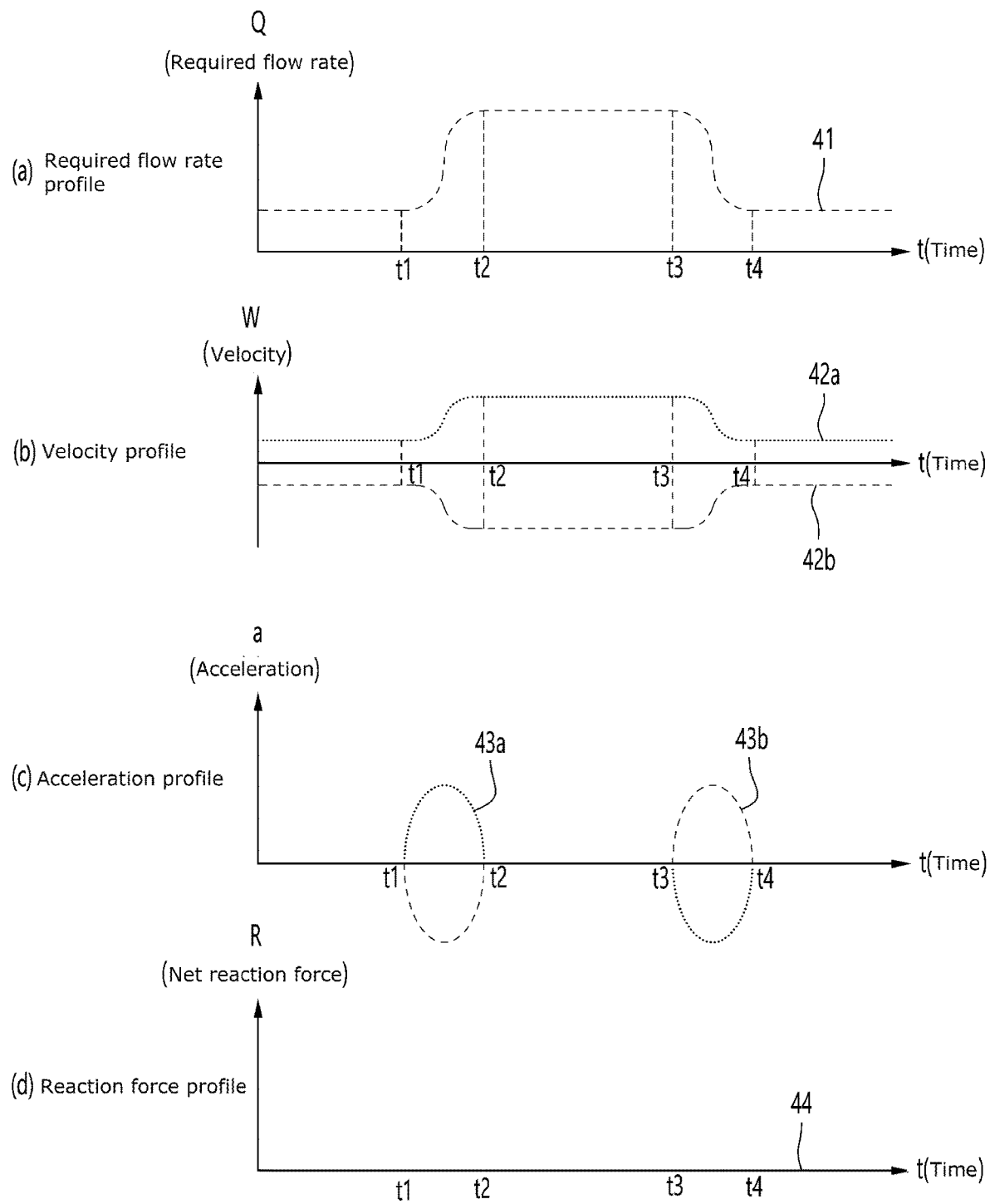
FIG. 9 is a diagram illustrating a velocity profile, acceleration profile, and a reaction force profile in the robot according to an embodiment of the present invention in a case in which the reaction forces acting to the robot are minimized.

FIG. 9 is a diagram illustrating a velocity profile, acceleration profile, and a reaction force profile of a robot having a plurality of pumps in a hydraulic power unit according to an embodiment of the present invention.

FIGS. 9A, 9B, 9C and 9D respectively illustrate a required flow rate profile 41, velocity profiles 42a and 42b, an acceleration profile 43a and 43b, and a reaction force profile 44 of the robot according to the present invention.

Even in FIG. 9, the profiles 41, 42a, 42b, 43a, 43b, and 44 respectively represent changes in sizes of a required flow rate, a velocity, an acceleration, and a net force of the reaction force in the first time section ranging from t1 to t4.

The required flow rate profile 41 is a graph showing the flow rate of the fluid required for driving the robot as a size of the required flow rate relative to time. In the same way as FIG. 8A, the required flow rate increases in a first section ranging from t1 to t2, is maintained relatively uniformly in a second section ranging from t2 to t3, and decreases in a third section ranging from t3 to t4.

The velocity profiles 42a and 42b are graphs showing the velocity (here, rotational velocity) of the pump relative to time in order to meet the required flow rate profile. The first velocity profile 42a indicates a velocity profile of the first pump 141, and the second velocity profile 42b indicates a velocity profile of the second pump 142. In this embodiment, since the hydraulic power unit 140 includes a first pump 141 and a second pump 142, the first pump 141 and the second pump 142 may share the velocity to meet the required flow rate profile 41. That is, the total flow rate required by the required flow rate profile 41 may be satisfied with the sum of flow rates discharged from the first pump 141 and the second pump 142. In this case, the sum of the sizes of the first velocity profile 42a and the second velocity profile 42b must be greater than or equal to the size of the required flow rate profile 41 in the first time section.

FIG. 9 illustrates an example in which the required flow rate required for the required flow rate profile 41 is equally distributed to the first pump 141 and the second pump 142 in order to completely offset the first reaction force R1 by the first pump 141 and the second reaction force R2 by the second pump 142. Accordingly, the control unit 130 controls the rotation (or torque) of the first pump 141 and the second pump 142 so that the first acceleration profile 43a of the first pump 141 and the second acceleration profile 43b of the second pump 142 are complementary to each other in the first time section.

Here, the term of 'complementary' means that the second acceleration profile 43b is formed in a direction to offset the first reaction force according to the first acceleration profile 43a. For instance, the size of the second acceleration profile 43b increases in the section where the size of the first acceleration profile 43a increases, but the size of the second acceleration profile 43b decreases in the section where the size of the first acceleration profile 43a decreases. Signs of the first acceleration profile 43a and the second acceleration profile 43b are opposite to each other.

In an embodiment, referring to FIG. 9, the first velocity profile 42a and the second velocity profile 42b have the same size but have opposite signs (namely, directions) in the first time section. Likewise, also the first acceleration profile 43a and the second acceleration profile 43b have the same size but have opposite signs in the first time section.

The reaction force profile 44 is a graph showing a net force of the reaction force generated depending on the acceleration profile relative to time. The sizes of the acceleration profiles 43a and 43b and the reaction force profile 44 are proportional, but their signs have opposite values. However, in the example of FIG. 9, since the first acceleration profile 43a and the second acceleration profile 43b have the same size and opposite signs, the net force of the reaction force (or net reaction force) caused by the first acceleration profile 43a and the second acceleration profile 43b becomes zero in the first time section.

In this case, the reaction force substantially acting on the robot becomes zero, it is possible to stably control the robot without any influence of the reaction force caused by the operation of the pump.

Meanwhile, in the robot equipped with the plurality of pumps in the hydraulic power unit, it is also possible to generate a net reaction force in a specific direction without completely offsetting the reaction forces generated by the pumps to use the generated net reaction force in controlling the robot as illustrated in FIG. 6 or 7.

Figure 10:
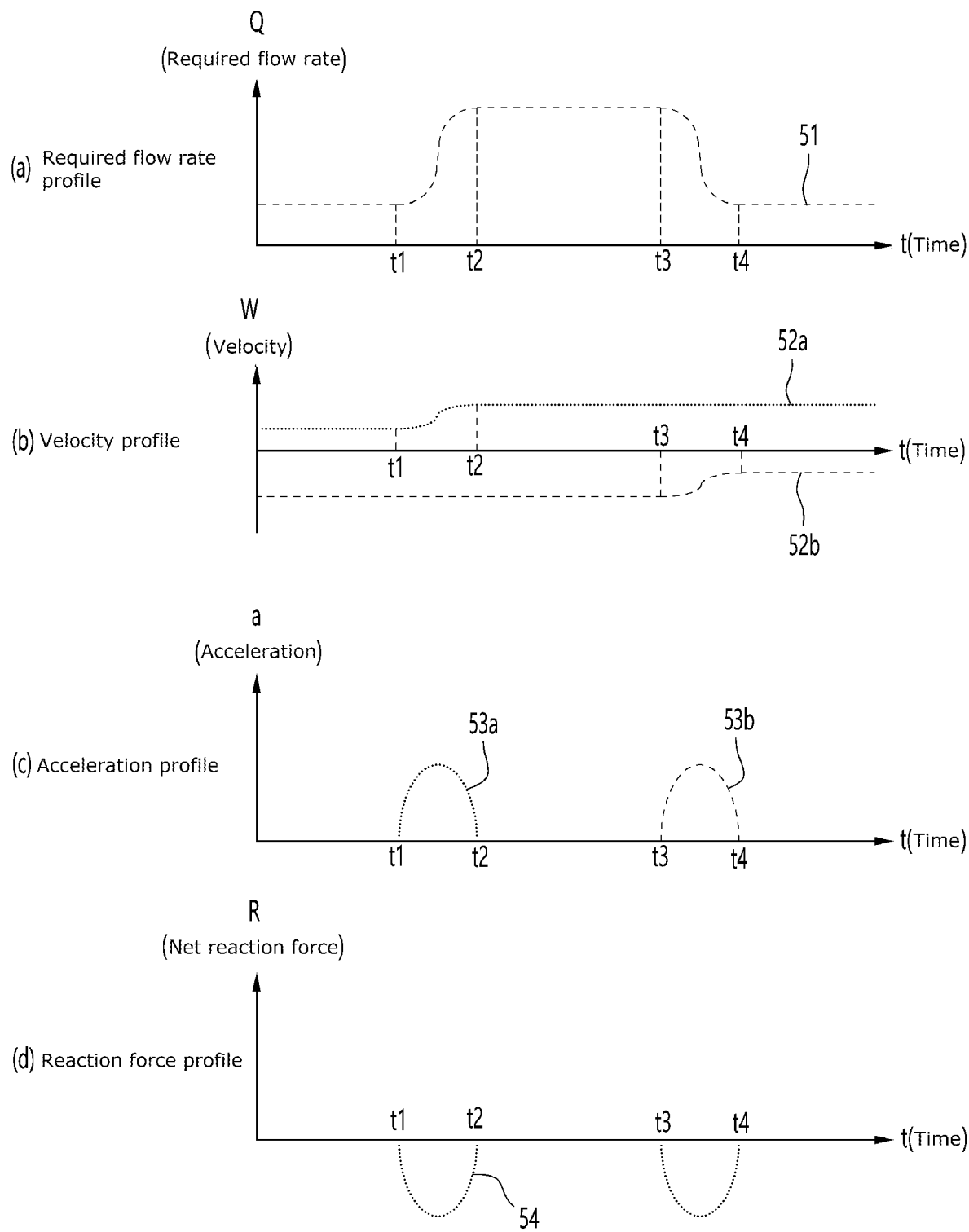
FIG. 10 is a diagram illustrating a velocity profile, acceleration profile, and a reaction force profile in the robot according to an embodiment of the present invention in a case in which net forces of the reaction forces are generated in a first direction.

FIG. 10 illustrates a case of differently controlling sizes of rotational forces acting on the first pump 141 and the second pump 142 to generate a net reaction force in the first direction.

FIGS. 10A, 10B, 10C and 10D respectively illustrate a required flow rate profile 51, velocity profiles 52a and 52b, acceleration profiles 53a and 53b, and a reaction force profile 54.

Even in FIG. 10, the profiles 51, 52a, 52b, 53a, 53b, and 54 respectively represent changes in sizes of a required flow rate, a velocity, an acceleration, and a net force of the reaction force in the first time section ranging from t1 to t4.

The required flow rate profile 51 is a graph showing the flow rate of the fluid required for driving the robot as a size of the required flow rate relative to time. In the same way as FIG. 9A, the required flow rate increases in a first section ranging from t1 to t2, is maintained relatively uniformly in a second section ranging from t2 to t3, and decreases in a third section ranging from t3 to t4.

The velocity profiles 52a and 52b are graphs showing the velocity (here, rotational velocity) of the pump relative to time in order to meet the required flow rate profile 51. The first velocity profile 52a indicates a velocity profile of the first pump 141, and the second velocity profile 52b indicates a velocity profile of the second pump 142. In this embodiment, since the hydraulic power unit 140 includes a first pump 141 and a second pump 142, the first pump 141 and the second pump 142 may share the velocity to meet the required flow rate profile 51. That is, the total flow rate required by the required flow rate profile 51 may be satisfied with the sum of flow rates discharged from the first pump 141 and the second pump 142. In this case, the sum of the sizes of the first velocity profile 52a and the second velocity profile 52b must be greater than or equal to the size of the required flow rate profile 51 in the first time section.

In FIG. 10, it is illustrated that in order to generate a net reaction force in the first direction, in the first time section, the velocity profile 52a of the first pump 141 monotonically increases and the velocity profile 52b of the second pump 142 monotonically decreases. Accordingly, the control unit 130 controls the rotation (or torque) of the first pump 141 and the second pump 142 so that the first acceleration profile 53a of the first pump 141 and the second acceleration profile 53b of the second pump 142 all have a zero sign or a positive sign in the first time section.

In this case, the first velocity profile 52a and the second velocity profile 52b are respectively in the states illustrated in FIG. 10B, and the first acceleration profile 53a and the second acceleration profile 53b are respectively in the states illustrated in FIG. 10C.

The reaction force profile 54 is a graph showing a net force of the reaction force generated depending on the acceleration profile relative to time. The sizes of the acceleration profiles 53a and 53b and the reaction force profile 54 are proportional, but their signs have opposite values. However, in the example of FIG. 10, since the first acceleration profile 53a and the second acceleration profile 53b all have a zero sign or a positive sign in the first time section, the net force of the reaction force (or net reaction force) caused by the first acceleration profile 53a and the second acceleration profile 53b has a negative sign (namely, acts in the first direction) in the first section and the third section, but becomes zero in the second section.

In this case, the net reaction force substantially acts on the robot in the first direction, the robot gets stronger against disturbance coming from the first direction.

Figure 11:
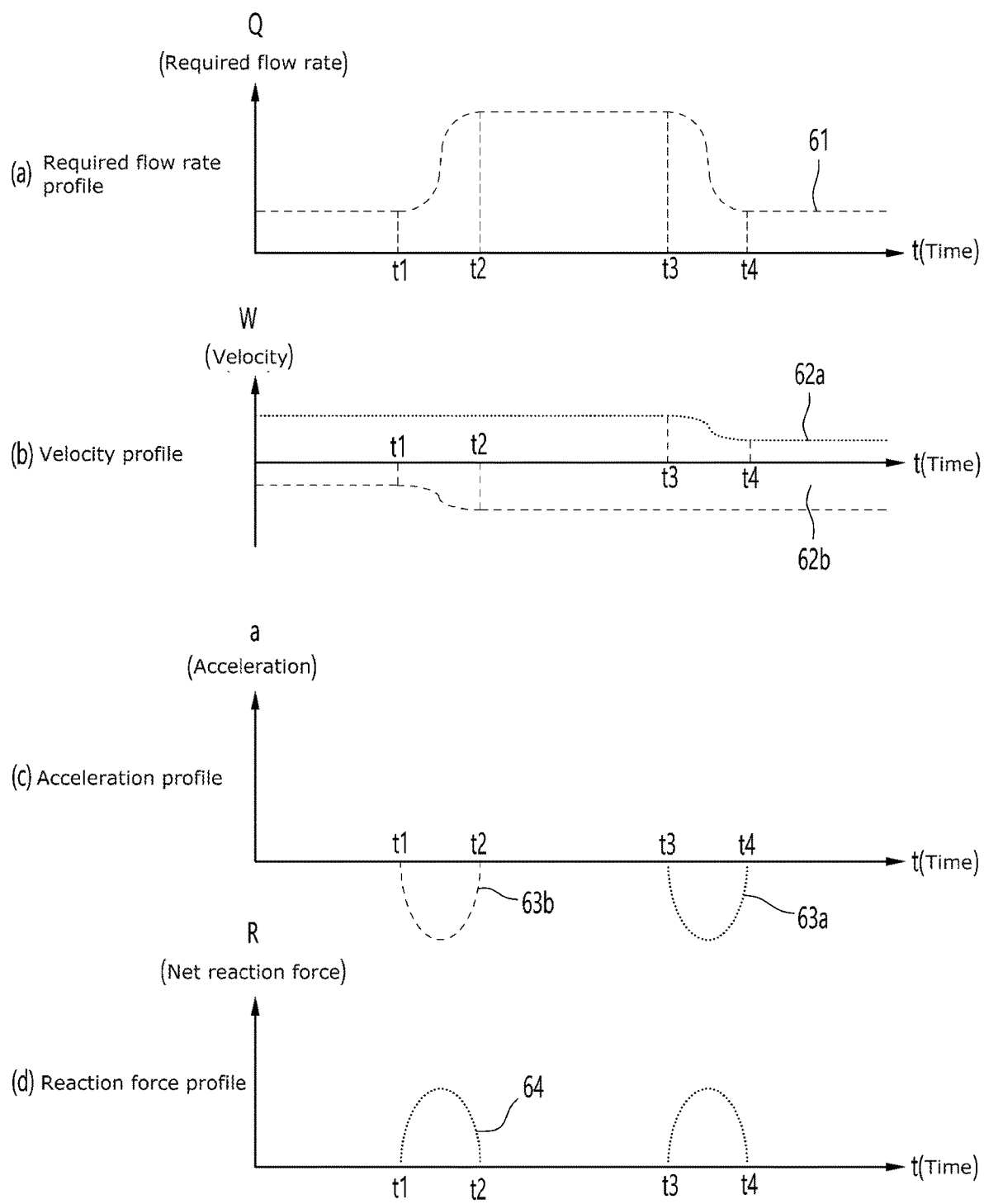
FIG. 11 is a diagram illustrating a velocity profile, acceleration profile, and a reaction force profile in the robot according to an embodiment of the present invention in a case in which net forces of the reaction forces are generated in a second direction.

FIG. 11 illustrates a case of differently controlling sizes of rotational forces acting on the first pump 141 and the second pump 142 to generate a net reaction force in the second direction.

FIGS. 11A, 11B, 11C and 11D respectively illustrate a required flow rate profile 61, velocity profiles 62a and 62b, acceleration profiles 63a and 63b, and a reaction force profile 64.

Even in FIG. 11, the profiles 61, 62a, 62b, 63a, 63b, and 64 respectively represent changes in sizes of a required flow rate, a velocity, an acceleration, and a net force of the reaction force in the first time section ranging from t1 to t4.

The required flow rate profile 61 is a graph showing the flow rate of the fluid required for driving the robot as a size of the required flow rate relative to time. In the same way as FIG. 9A, the required flow rate increases in a first section ranging from t1 to t2, is maintained relatively uniformly in a second section ranging from t2 to t3, and decreases in a third section ranging from t3 to t4.

The velocity profiles 62a and 62b are graphs showing the velocity (here, rotational velocity) of the pump relative to time in order to meet the required flow rate profile 61. The first velocity profile 62a indicates a velocity profile of the first pump 141, and the second velocity profile 62b indicates a velocity profile of the second pump 142. In this embodiment, since the hydraulic power unit 140 includes a first pump 141 and a second pump 142, the first pump 141 and the second pump 142 may share the velocity to meet the required flow rate profile 61. That is, the total flow rate required by the required flow rate profile 61 may be satisfied with the sum of flow rates discharged from the first pump 141 and the second pump 142. In this case, the sum of the sizes of the first velocity profile 62a and the second velocity profile 62b must be greater than or equal to the size of the required flow rate profile 61 in the first time section.

In FIG. 11, it is illustrated that in order to generate a net reaction force in the second direction, in the first time section, the velocity profile 62a of the first pump 141 monotonically decreases and the velocity profile 62b of the second pump 142 monotonically increases. Accordingly, the control unit 130 controls the rotation (or torque) of the first pump 141 and the second pump 142 so that the first acceleration profile 63a of the first pump 141 and the second acceleration profile 63b of the second pump 142 all have a zero sign or a positive sign in the first time section.

In this case, the first velocity profile 62a and the second velocity profile 62b are respectively in the states illustrated in FIG. 11B, and the first acceleration profile 63a and the second acceleration profile 63b are respectively in the states illustrated in FIG. 11C.

The reaction force profile 64 is a graph showing a net force of the reaction force generated depending on the acceleration profile relative to time. The sizes of the acceleration profiles 63a and 53b and the reaction force profile 64 are proportional, but their signs have opposite values. However, in the example of FIG. 11, since the first acceleration profile 63a and the second acceleration profile 63b all have a zero sign or a negative sign in the first time section, the net force of the reaction force (or net reaction force) caused by the first acceleration profile 63a and the second acceleration profile 63b has a positive sign (namely, acts in the second direction) in the first section and the third section, but becomes zero in the second section.

In this case, the net reaction force substantially acts on the robot in the second direction, the robot gets stronger against disturbance coming from the first direction.

Meanwhile, in the above embodiments, it is illustrated that the hydraulic power unit 140 includes two pumps 141 and 142, but the scope of the present invention is not limited thereto. For example, the hydraulic power unit 140 may include a plurality of pumps. The plurality of pumps may further include a third pump rotating in a third rotational direction and discharging the fluid to the hydraulic channel 150 by a rotational force in the third rotational direction, and a fourth pump rotating in a fourth rotational direction and discharging the fluid to the hydraulic channel 150 by a rotational force in the fourth rotational direction.

In this instance, the third rotational direction may be different from the fourth rotational direction, and a third rotational axis and a fourth rotational axis may have the same direction.

In an embodiment, the third rotational direction may be clockwise, and the fourth rotational direction may be counterclockwise.

In an embodiment, the rotational axes of the first pump 141 and the second pump 142 and the rotational axes of the third pump and the fourth pump may be configured in different directions. For example, the rotational axes of the first pump 141 and the second pump 142 may be configured to face the front of the robot, and the rotational axes of the third pump and the fourth pump may be configured to face the side of the robot.

In this instance, a net force of a reaction force generated by the first pump 141 and the second pump 142 may be used to control right-and-left postures of the robot, and a net force of a reaction force generated by the third pump and the fourth pump may be used to control back-and-forth postures of the robot.

According to the embodiments of the present invention described above, the robot including the hydraulic power unit capable of minimizing a reaction force depending on the operation of the hydraulic power unit is provided. In addition, the robot according to the present invention can advantageously control the reaction force of the pumps, thereby facilitating a posture control of the robot and better resisting against disturbance applied to the robot.

Hereinafter, an exemplary computing device 500 that can implement an apparatus and a system, according to various embodiments of the present invention, will be described with reference to FIG. 12. For example, the computing device 500 may be the robot 100 or the control unit 130 depicted in FIG. 1.

Figure 12:
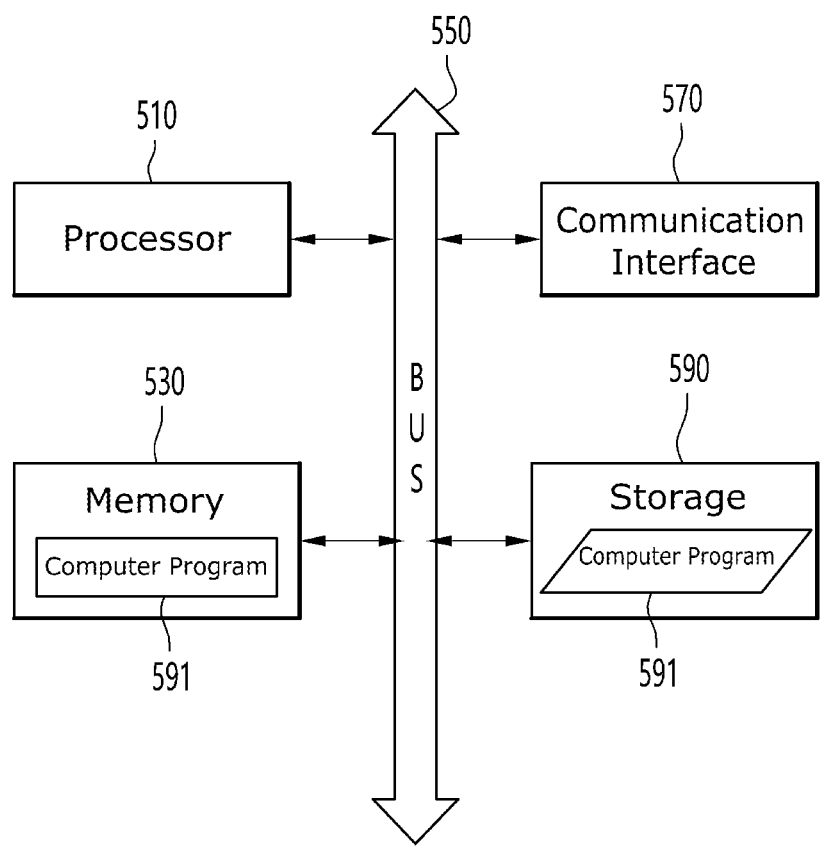
FIG. 12 is a block diagram illustrating a hardware configuration of a computing device implemented by various embodiments of the present invention.

FIG. 12 is an example hardware diagram illustrating a computing device 500.

As shown in FIG. 12, the computing device 500 may include one or more processors 510, a bus 550, a communication interface 570, a memory 530, which loads a computer program 591 executed by the processors 510, and a storage 590 for storing the computer program 591. However, FIG. 12 illustrates only the components related to the embodiment of the present invention. Therefore, it will be appreciated by those skilled in the art that the present invention may further include other general purpose components in addition to the components shown in FIG. 12.

The processor 510 controls overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/operation according to various embodiments of the present invention. The computing device 500 may have one or more processors.

The memory 530 stores various data, instructions and/or information. The memory 530 may load one or more programs 591 from the storage 590 to execute methods/operations according to various embodiments of the present invention. An example of the memory 530 may be a RAM, but is not limited thereto.

The bus 550 provides communication between components of the computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to comprise a communication module well known in the art of the present invention.

The storage 590 can non-temporarily store one or more computer programs 591. The storage 590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present invention are implemented. When the computer program 591 is loaded on the memory 530, the processor 510 may perform the methods/operations in accordance with various embodiments of the present invention by executing the one or more instructions.

The technical features of the present invention described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present invention.

What is claimed is:

1. A robot comprising:
    a body having a hydraulic channel through which a fluid is movable, and a hydraulic power unit having a plurality of pumps, and discharging the fluid to the hydraulic channel by using rotational force of the plurality of pumps, wherein the plurality of pumps comprises:
        a first pump rotating in a first rotational direction and discharging the fluid to the hydraulic channel, and
        a second pump rotating in a second rotational direction and discharging the fluid to the hydraulic channel,
        wherein the first rotational direction is opposite to the second rotational direction, and a first rotational axis of the first pump and a second rotational axis of the second pump have the same direction;
    a control unit for controlling the rotation of the plurality of pumps; and one or more legs coupled to the body,
wherein pressure generated in the hydraulic channel by discharging the fluid to the hydraulic channel by rotational motion of the plurality of pumps is transmitted to the legs, and acts as a driving force operating the legs,
the sum of a first pressure generated in the hydraulic channel by the first pump's rotation in the first rotational direction and a second pressure generated in the hydraulic channel by the second pump's rotation in the second rotational direction is transmitted to the legs, and
the difference between a first reaction force generated by the first pump's rotation in the first rotational direction and a second reaction force generated by the second pump's rotation in the second rotational direction is transmitted to the body,
wherein the control unit changes a rotational velocity of at least one of the first and second pumps based on a direction of an external force applied to the body, and controls a posture of the robot.

2. The robot according to claim 1, wherein the control unit controls the rotation of the first pump and the rotation of the second pump so that a first acceleration profile of the first pump and a second acceleration profile of the second pump are complementary to each other in a first time section.

3. The robot according to claim 2, wherein a first velocity profile of the first pump and a second velocity profile of the second pump have opposite directions to each other in the first time section, and
wherein a sum of sizes of the first velocity profile and the second velocity profile is greater than or equal to the size of a predetermined required flow rate profile in the first time section.

4. The robot according to claim 3, wherein the first time section includes a first section in which the size of the required flow rate profile increases from a first size to a second size, a second section in which the size of the required flow rate profile is maintained at the second size, and a third section in which the size of the required flow rate profile decreases from the second size to the first size.

5. The robot according to claim 1, wherein the control unit controls the rotation of the first pump and the rotation of the second pump so that a first acceleration profile of the first pump and a second acceleration profile of the second pump become zero or have the same value in a first time section.

6. The robot according to claim 5, wherein a first velocity profile of the first pump and a second velocity profile of the second pump have opposite directions to each other in the first time section, and
wherein a sum of sizes of the first velocity profile and the second velocity profile is greater than or equal to a size of a predetermined required flow rate profile in the first time section.

7. The robot according to claim 6, wherein the first time section includes a first section in which the size of the required flow rate profile increases from a first size to a second size, a second section in which the size of the required flow rate profile is maintained at the second size, and a third section in which the size of the required flow rate profile decreases from the second size to the first size.

8. The robot according to claim 1, wherein the plurality of pumps further comprises:
a third pump rotating in a third rotational direction and discharging the fluid to the hydraulic channel by a rotational force in the third rotational direction; and
a fourth pump rotating in a fourth rotational direction and discharging the fluid to the hydraulic channel by a rotational force in the fourth rotational direction,
wherein the third rotational direction is different from the fourth rotational direction, and
wherein a third rotational axis of the third pump and a fourth rotational axis of the fourth pump have the same direction.

9. The robot according to claim 8, wherein the third rotational axis of the third pump and the fourth rotational axis of the fourth pump have different directions from each other.

10. The robot according to claim 8, wherein the first rotational direction and the third rotational direction are clockwise, and the second rotational direction and the fourth rotational direction are counterclockwise.

* * * * *